Figure 1:
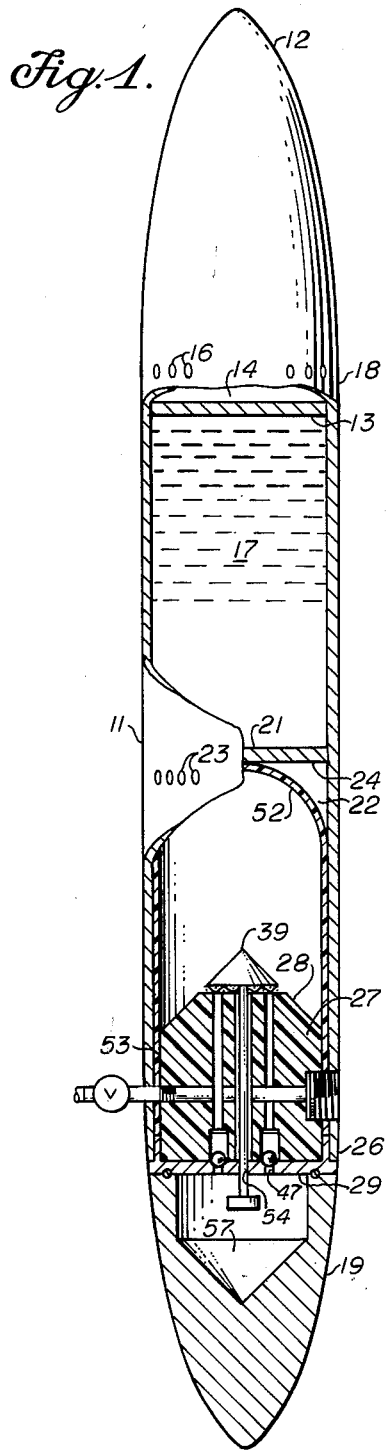

April 12, 1966     P. B. ARCHIBALD     3,245,268

WATER SAMPLER

Filed May 8, 1964

INVENTOR.
PAUL B. ARCHIBALD

BY Roland A. Anderson

ATTORNEY

United States Patent Office 3,245,268
Patented Apr. 12, 1966

3,245,268
WATER SAMPLER
Paul B. Archibald, Pleasanton, Calif., assignor to the United States of America as represented by the United States Atomic Energy Commission
Filed May 8, 1964, Ser. No. 366,207
6 Claims. (Cl. 73—425.6)

The invention described herein was made in the course of, or under, Contract W–7405–ENG–48 with the United States Atomic Energy Commission.

This invention relates to devices for collecting water samples and especially to devices for obtaining samples from deep water. More particularly it appertains to a water sampler that descends free of cables to a preeslected depth, gathers an uncontaminated sample, and thenceforth returns to the surface.

The classical means for obtaining deep water samples is the Nansen bottle which is essentially a tube open at both ends and provided with actuable closures. These bottles are generally lowered by means of winches and cables to the desired depth as estimated by the amount of cable reeled out. The sampler is then sent a command signal which actuates said closures which, for example, may be spring loaded shutters that close to trap a sample. Although this method is satisfactory for some purposes it has certain disadvantages. Expensive and cumbersome machinery is necessary to tend the cable which lowers the sample bottles. Time and manpower expenditures necessary for obtaining the sample are considerable. Only one sample can be obtained during each operation unless a very complicated staging arrangement with multiple bottles is used. Samples obtained by this method are often contaminated by reason of the tube being open during its descent and therefore accessible to contamination, e.g., by unwanted biological or radioactive materials encountered above the desired depth. Estimation of the depth to which the sample bottle has descended is complicated by movement of the ship and layer currents which do not permit a vertical orientation of the cable.

Accordingly, there exists an obvious need for a relatively fast, inexpensive means for obtaining a number of uncontaminated samples from various depths, e.g., when it is desired to test the uncontaminated composition or the biological and/or radioactive content of the ocean at different levels. In order to obtain maximum economy such a means should be lightweight, easy to handle, relatively inexpensive, and perform the task in a minimum of time.

The present invention satisfies the foregoing need and overcomes difficulties of prior devices by the provision of a free floating deep water sampler of relatively simple and inexpensive construction that descends accurately to a preselected depth, obtains an uncontaminated sample in a sterile container, and ascends to the surface independent of exterior control or environmental conditions.

In brief, the device of the invention is comprised of a buoyant outer case with a sample receiving compartment located inside thereof. An especially adapted valve block is attached to the case having a unidirectional porting means located therein to permit a water sample to flow into the compartment in the outer case, and be retained therein. A rupture disc is located in the valve block in communication with the exterior water pressure, and is designed to rupture when the sampler has sunk to a preselected depth. To afford recovery, a disengageable weight is held adjacent the valve block and outer case, over the unidirectional porting means, by means of a vacuum. This vacuum is introduced to the sample compartment and valve block through a valving means. The weight insures that the buoyancy of the composite valve block, outer case, and weight is negative. However, the dimensions and density of the composite valve block, outer case and collected sample, less the disengageable weight, are proportioned to provide a positive buoyancy. A second porting means is located in the valve block and communicates with the weight, the rupture disc, the valving means, and the sample compartment, for applying and maintaining a vacuum in all of these areas prior to submersion. The aforementioned valving means communicates with the second porting means in order to introduce and seal in the vacuum. Means are provided for arranging that the integrity of the vacuum is broken once the preselected depth is reached. The sample is then collected at depth and the weight disengages from the sampler, changing the buoyancy of the sampler from negative to positive, whereupon, the sampler returns to the surface.

It is, therefore, an important object of the present invention to provide an improved device for obtaining water samples at submerged locations.

Another object of the invention is to provide a device which will descend to, obtain a water sample, and arise from any preselected depth unaided.

A further object of the invention is to provide a water sampler able to obtain an uncontaminated sample of the water.

Yet another object of the invention is to provide a relatively lightweight and inexpensive water sampler.

Figure 2:
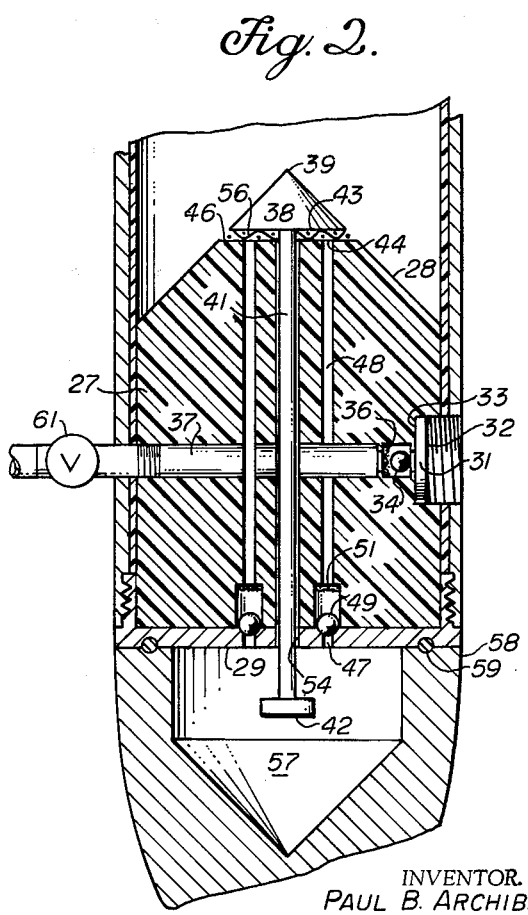

Further objects of the invention will become apparent from the following description and accompanying drawing of which:

FIGURE 1 depicts a preferred embodiment of the invention, partly in elevation and partly in longitudinal section, as it appears ready for submersion; and FIGURE 2 is an enlarged fragmentary view of portions of FIGURE 1.

Referring now to FIGURE 1, in constructing the water sampler of the invention, there is provided an outer case 11 generally cylindrical in form with a bullet-shaped upper end 12 defining, with partition wall 13, a first compartment 14. Outer case 11 is of streamlined configuration to provide the fastest possible ascent once the weight has been released. Ports 16 are provided in the upper end 12 of outer case 11 to permit water to enter the first compartment 14 and prevent collapse of the structure when subjected to heavy water pressure. The outer case 11 can thus be constructed of a relatively lightweight material since it need only be able to withstand the compressive stresses of the water pressure exerted upon the thickness of the material, but does not have to structurally withstand an unbalanced pressure differential applied cross the walls thereof. When the sampler has returned to the surface at least the first compartment 14 projects from out of the water to aid in visual or radar location of the device for recovery.

A second compartment 17 is located adjacent the lower end 18 of the first compartment and is completely filled with a relatively incompressible substance less dense than water, e.g., a liquid such as hydrocarbons, including gasoline, kerosene, etc., or a solid such as lithium or hollow glass balls. Enough of the selected substance must be provided to ensure that the sampler will have positive buoyancy or flotation at any depth once the sample has been taken and a detachable sinking weight 19, attached to the lower end of case 11 in a manner described more fully hereinafter, has been released. The portion of the outer case 11 forming the second compartment must be flexible enough to compensate for any compression that the substance undergoes from the increased water pressure during the descent, or the end covers 13 and 21 may be made of a deformable material so as to flex in and out sufficiently to accommodate the deformation.

A third compartment 22 defined between partition wall 21 and the lower end 26 of case 11 has ports 23 provided in the outer case 11 similar to those associated with the first compartment to permit entry of water during descent. A first or upper end 24 of compartment 22 is then defined by the lower side of partition wall 21. The second or lower end 26 of the third compartment is adapted, e.g., by the provision of internal threads, for receiving a threaded removable valve block 27 which has a generally cylindrical form permitting it to fit in spaced relation inside the lower end 26 of the outer case 11. The valve block has an internal face 28 which is shaped like a truncated cone and which normally resides facing upwards within the third compartment 22. The lower end of the valve block has a generally flat external face 29 against which weight 19 abuts, and after the weight 19 has been released, is exposed to the water.

Now, referring to FIGURE 2; for purposes of admitting the water sample into compartment 22 there is provided a rupture disc 31, having a first or outer side 32 and a second or inner side 33, located in a recess in the valve block 27, said recess opening into a first passageway described below. Outer side 32 of the disc is exposed to the water while a vacuum exists on the inner side 33, within the valve block 27, as described below. Rupture discs are produced commercially and are certified to be accurate to within ±5%. Laboratory experience indicates that discs generally reliable to ±2% may be obtained or fabricated. These discs provide greater accuracy for selecting the actuating depth at which a sample is taken than was heretofore available. The pressure rating of the disc, which corresponds with the preselected depth of the desired sample, is easily calculated from published densities of fresh and sea water. This pressure rating is equal to the hyrostatic pressure existing at the preselected depth. A one way check valve 34 and retaining screen 36 are located inside the valve body in first passageway 37, which is bored laterally therethrough, to prevent the water sample from backflowing out through the rupture disc once it has failed and the sample has been taken.

A connecting channel 38 is centrally oriented in valve block 27, extending axially therethrough. A double ended valve is provided having an upper or first plug end 39, generally cone-shaped, disposed above the flattened upper portion of the valve block 27, inside the third compartment 22, and reciprocally supported by an interconnecting pushrod 41. The cone-shaped end 39 is designed to complement the truncated cone-shaped portion of the internal face 28 of the valve block. Push-rod 41 extends from the upper end 39 through the valve block in channel 38 to terminate in the lower, or second, end 42 which is shown as discoidal in form. The shape of the lower end is unimportant since it only serves to prevent the valve from being pushed into the third compartment by the force of the water impinging upon the lower surface 43 of the cone-shaped upper end 39. Thus it only need be larger in diameter than the channel 38. An upper or first orifice 44 is located in the flat truncated portion 46 of the internal face 28 of the valve block 27. A lower or second orifice 47 in the extenral face 29 of the valve block permits water to enter a second passageway 48, bored longitudinally through the block and intercommunicated with passageway 37, and pass therethrough to emerge from the upper or first orifice 44. A multiplicity of orfices and passageways could be provided as shown, e.g. if necessary to provide an increased flow rate. Check valve 49 disposed in passageway 48 prevents the water sample from draining downward out of the lower orifice 47 after the sample has been collected. Wire screen 51 disposed upwardly from check valve 49, in passageway 48, prevents the check valve mechanism from being blown into the third compartment 22 by the water pressure during influx of the water under hydrostatic pressure.

Referring again to FIGURE 1; in operation, the water sample enters through the second passageway 48 into a collapsible sterile container 52 of generally inverted dome shaped configuration, which is preferably constructed of rubber but can be made of any synthetic elastic material which has equivalent characteristics to meet the requirements. Prior to submersion the container is collapsed by application of a vacuum as noted hereinafter. The container 52 is restrained in the third compartment 22 when the water sample is inflooding by contact with the sides of the outer case 11 and the upper end 24 of the third compartment. The sample container is fitted tightly over the cylindrical sides 53 of the valve block 27 so that it encompasses all of the truncated cone-shaped portion of the internal face 28 and is disposed between said block and adjacent interior surfaces of case 11. Valve plug 39 prevents the jet of the high pressure water entering the device through second passageway 48 from damaging the interior of the sample container 52. The lower end 42 of the valve alternatively is made removable from the pushrod 41 for assembly purposes. The lower end 54 of the passageway 38 has a relatively close fit, about a .010 inch clearance or less, around the interconnecting pushrod 41 to prevent water from backflowing out of the sample container (this structural representation is better shown in FIGURE 1). This small clearance solves an additional problem in that any expansion of the water sample during the ascent from lower depths, due to an increase in temperature of the water sample, or due to the lessening of pressure on the water sample, will be compensated for by water escaping through this flow restricting clearance.

A wire screen 56 surrounds the pushrod 41 between the lower surface 43 of the valve end 39 and the internal face 46 of the valve block. The purpose of the screen 56 is to prevent the vacuum from pressing the collapsed sample container so tightly on the cone-shaped valve end 39 that the water cannot enter the sample container. The wire screen 56 provides enough working area on the inside of the collapsed sample container 52 for the pressure of the water entering the valve block, by means of passage 48, to expand and fill the sample container. The surface of the valve end 39 is sandblasted to help the water pressure penetrate and enter the collapsible sample container.

The whole assembly, less the weight 19, has positive buoyancy by reason of the low density of the material in the second compartment 17, so that the sampler will ascend from any depth when the weight 19 is released. The weight 19 is generally bullet shaped for streamlining to provide the fastest possible descent. It has a hollow portion 57 at the upper end within the generally cylindrical portion 58. This end 58 mates with the external face 29 of the valve block. The weight 19, held to the valve block by vacuum, disengages from the valve block when the integrity of the vacuum is broken. In operation this occurs when the rupture disc 31 fails. The weight 19 covers the lower orifice 47 of passageway 48 to prevent water from entering the sample container until the weight has been released. Sealing means 59, here shown as an O-ring seal, provides physical integrity for preserving the vacuum. The weight provide sthe necessary negative buoyancy component to enable the sampler to sink to the desired depths.

First passageway 37 communicates with the inner side 33 of the rupture disk 31 and with the channel 38. Thus, by means of the second passageway 48, and channel 38, it indirectly communicates with the interior of the sample container 52 and the hollow portion 57 of the weight. A vacuum is pulled upon this first passageway 37 and the air is removed from all of the open volume areas inside the sampler, and the sample container 52 collapses. Check valves 36 and 44 are so designed and located that they permit establishment of the vacuum within all these areas. The small clearance 54 between the interconnecting link 41 and the valve block in channel 38 does not hinder either the establishment of the vacuum or the subsequent penetration of water into the hollow portion 57 of the weight.

Valving means 61 are inserted in the second passageway so that once the vacuum has been established, the internal system can be valved off and the vacuum retained within the sampler. By establishing a vacuum in the second passageway 37, the hollow portion and the sample container are also necessarily evacuated by reason of the intercommunicating passageways and channels. The valve means 61 also permits an easy access for removing the collected water sample from the sample container 38, without requiring disassembly of the whole sampler. When the valve means 61 has been removed valve block 27 and sample container 52 can be removed from the outer case 11 as one unit.

The sampler operates by first applying a vacuum pump to evacuate the interior portions of the sampler through the valving means 61 with the weight 19 in position adjacent the valve block 27 at the bottom of the sampler. Once the sampler is evacuated the valving means 61 are actuated so that the pumping equipment can be disconnected and the vacuum will remain in the sampler. The sampler unit is dropped overboard from a ship and descends due to the negative buoyance provided by the weight 19. At the desired preselected depth the rupture disc 31, which has been chosen to withstand only a pressure corresponding to the preselected depth, taking into account the internal vacuum, fails. This violates the integrity of the vacuum permitting the water to enter and the weight 19 to separate from the sampler. Water enters the sample container 52 through the first porting means 48 and is prevented from backflowing out of the compartment by the one way uniflow design described above. Then due to the positive buoyancy of the remaining portion of the sampler without the weight, the sampler returns to the surface and is recovered.

If for some reason it is desired to release the sampler in water shallower than the depth the rupture disc could withstand, a simple trip lever could be provided which would open valve 61 when the device struck the bottom. This would return the sampler to the surface for recovery.

While the present deep water sampler has been described in detail with respect to one embodiment thereof, it is evident that various modifications could be made within the spirit and scope of the present invention. Therefore the invention is not to be limited to the details shown except insofar as they are defined in the following claims.

What is claimed is:
1. A deep water sampler comprising,
 (a) a buoyant outer case having a compartment for receiving water samples therein,
 (b) a valve block affixed to said outer case the combination of said valve block and said outer case having positive buoyancy,
 (c) first porting means through said valve block for unidirectional water flow into said compartment,
 (d) a rupture disc located in said valve block in pressure communication with the water outside said case,
 (e) a weight disengageably mated to said outer case adjacent said valve block and covering an exterior opening of said first porting means, the combination of said outer case, said valve block and said weight having negative buoyancy.
 (f) a second porting means through said valve block communicating with said rupture disk said compartment and said weight,
 (g) check valve means associated with said second porting means to prevent backflow of water out of said compartment, and
 (h) means for establishing and retaining a vacuum within said second porting means and said compartment.

2. A deep water sampler comprising;
 (a) a buoyant outer case having a water sample compartment therein,
 (b) a valve block affixed to said outer case and communicating with said compartment, the combination of said case and said valve block having positive buoyancy,
 (c) said valve block defining a first porting means having at least first and second terminal orifices and communicating passageways between said orifices said second orifice exposable for contact with the water,
 (d) a partially hollow massive weight disengageably mated to said outer case adjacent said valve block and covering said second orifice the buoyancy of said case said valve body and said weight being negative,
 (e) a rupture disk located in said valve block in pressure communication with the water outside said case,
 (f) a second porting means through said valve block communicating with said rupture disk said sample compartment and said weight,
 (g) check valve means associated with said first and second porting means for permitting unidirectional water flow into said sample compartment, and
 (h) valving means communicating with said second porting means for applying and retaining a vacuum within said second porting means.

3. A deep water sampler comprising,
 (a) a compartmented outer case having at least first and second compartments therein,
 (b) said first compartment completely filled with a relatively incompressible substance less dense than water,
 (c) a valve block affixed to said outer case communicating with said second compartment,
 (d) a first porting means through said block terminating with a first orifice in said second compartment and a second orifice exposable to the water to be sampled,
 (e) a sample container located inside said second compartment affixed to said valve block and encompassing said first orifice the combination of said case said valve block and said sample container having positive buoyancy,
 (f) a massive weight having a hollow portion and disengageably mated to said outer case adjacent said valve block and covering said second orifice the buoyancy of said case, said valve body, said sample container and said weight being negative,
 (g) said valve block defining a second porting means communicating with said rupture disk, said sample container and said hollow portion of said weight,
 (h) check valve means associated with said first and second porting means for permitting unidirectional water flow into said sample container, and
 (i) valving means communicating with said second porting means for applying and retaining a vacuum within said second porting means.

4. The sample container recited in claim 3 wherein;
 (a) said outer case surrounding said second compartment defines at least one port for the communication of water into said compartment, and
 (b) said sample container is of a collapsible construction.

5. A deep water sampler comprising;
 (a) an outer elongated case defining first, second, and third compartments along its length,
 (b) said first compartment having at least one port for the communication of water into said compartment,
 (c) said second compartment being adjacent said first compartment and filled with a relatively incompressible substance less dense than water, (d) said third compartment having at least one port in said outer case for the communication of water into said compartment and having first and second ends, said first end located adjacent said second compartment, (e) a valve block removably affixed to said second end of said third compartment and having an internal face positioned inside said third compartment and an external face exposable to the water, (f) said valve block defining at least one first passageway in said valve block communicating between and having terminals in said internal and external faces, (g) a collapsible water sample container located within said third compartment encompassing at least a portion of the internal face of said valve block and covering the internal terminal of said first passageway, the buoyancy of the heretofore described assembly being positive, (h) a partially hollow massive weight disengageably mated to said outer case adjacent said valve block with said hollow portion communicating with said external face and covering the external terminal of said first passageway, the buoyancy of said sampler with said weight attached being negative, (i) a rupture disk located in said valve block having one face in pressure communication with the water outside said case, (j) said valve block defining at least a second passageway communicating with the other face of said rupture disc said hollow portion of said weight and said sample container, (k) check valve means associated with said first and second passageways for preventing backflow of water out of said sample container, and (l) valving means communicating with said second passageway for applying and retaining a vacuum within said second passageway.

6. A deep water sampler comprising, (a) a generally cylindrical outer casing or relatively lightweight material defining adjacent first, second and third compartments, axially aligned along its length, (b) said first compartment having two ends the first end tapering into a generally bullet shaped point and the second end generally cylindrical and having at least one port for the communication of water pressure thereinto, (c) said second compartment adjacent said second end of said first compartment and completely filled with a relatively incompressible substance less dense than than water said second compartment flexible under compressive stresses, (d) said third compartment defining at least one port in said outer case for the communication of water pressure thereinto and having first and second ends, said first end adjacent said second compartment, (e) a generally cylindrical valve block adapted to mate with said second end of said third compartment and removably affixed thereto having at least an internal face generally truncated cone-shaped positioned inside said third compartment and a generally flat external face exposable to the water, (f) said valve block defining at least one first water passageway in said valve block extending from a first orifice in the flat portion of the truncated cone-shaped internal face to a second orifice in said external face, (g) one way check valve means located in said first passageway to prevent backflow from said first orifice to said second orifice, (h) a collapsible sterile water sample container located within said third compartment encompassing said truncated cone-shaped internal face of said valve block, (i) a rupture disc recessed into said valve body having first and second sides said first side in pressure communication with the water outside said case, (j) one way check valve means associated with said rupture disc to prevent backflow of water from said sample container through said rupture disc, (k) said valve block defining a connecting channel centrally oriented through said valve block, (l) a double ended valve having first and second ends and a rigid interconnecting pushrod said first end generally cone-shaped and formed to mate with said truncated cone-shaped internal face of said valve block said second end removable from said interconnecting link and larger in diameter than said link said valve positioned within said connecting channel, (m) said connecting channel having a portion relatively closely surrounding said interconnecting link, (n) a wire screen surrounding said interconnecting link between valve block internal face and said first cone-shaped piston the heretofore described assembly having a positive buoyancy, (o) a generally bullet shaped massive weight defining a hollow portion and having one generally cylindrical shaped portion formed to disengageably mate with said external face of said valve block and cover said second orifice of said first passageway, (p) sealing means between said valve block and said weight the heretofore described assembly including said weight having negative buoyancy, (q) said valve block defining at least a second internal passageway communicating with said second side of said rupture disk and said connecting channel of said valve block, and (r) valving means communicating with said second passageway for applying and retaining a vacuum within said second passageway.

References Cited by the Examiner
UNITED STATES PATENTS

| | | | |
|---|---|---|---|
| 1,981,817 | 11/1934 | Weatherly | 166—164 |
| 2,798,378 | 7/1957 | Del Raso et al. | 73—421 X |
| 3,022,826 | 2/1962 | Kisling | 166—164 X |

LOUIS R. PRINCE, *Primary Examiner.*